(12) United States Patent
Gregory

(10) Patent No.: US 8,630,690 B2
(45) Date of Patent: Jan. 14, 2014

(54) THERMAL CONTRACTION COMPENSATION FOR SUPERCONDUCTING AND CRYO-RESISTIVE CABLES

(75) Inventor: Brian Gregory, Dartford (GB)

(73) Assignee: Electric Power Research Institute, Inc., Charlotte, NC (US)

( * ) Notice: Subject to any disclaimer, the term of this patent is extended or adjusted under 35 U.S.C. 154(b) by 1257 days.

(21) Appl. No.: 12/435,439

(22) Filed: May 5, 2009

(65) Prior Publication Data

US 2010/0285968 A1 Nov. 11, 2010

(51) Int. Cl.
*H01B 12/00* (2006.01)
*H01R 4/68* (2006.01)
*H02G 15/34* (2006.01)

(52) U.S. Cl.
USPC .................. 505/230; 174/125.1; 29/599

(58) Field of Classification Search
USPC ........ 505/163, 230, 231, 300, 430, 928, 930; 174/125.1, 15.4, 15.5, 110 R, 12 R; 29/599, 452, 825, 828, 857
See application file for complete search history.

(56) References Cited

U.S. PATENT DOCUMENTS

| | | | |
|---|---|---|---|
| 5,946,788 A * | 9/1999 | Griffioen et al. | 29/433 |
| 7,709,742 B2 * | 5/2010 | Allais et al. | 174/125.1 |
| 7,979,976 B2 * | 7/2011 | Soika et al. | 29/599 |
| 2010/0227764 A1 * | 9/2010 | Willen et al. | 505/163 |

* cited by examiner

*Primary Examiner* — Stanley Silverman
*Assistant Examiner* — Kallambella Vijayakumar
(74) *Attorney, Agent, or Firm* — Trego, Hines & Ladenheim, PLLC

(57) ABSTRACT

A method of compensating for thermal contraction of superconducting and cryo-resistive cables. The method includes the steps of determining a compensation length for a cable such that when the cable is subjected to an operating temperature, the cable is in or near a stress-free state, and installing the cable into a pipe such that portions of the cable extend outwardly past ends of the pipe. The method further includes the steps of marking each end of the cable such that the determined compensation length is visibly shown, forcing the cable into the pipe at an ambient installation temperature such that a cable pattern is formed therein, and maintaining the cable in the pipe to prevent the cable from being pushed out of the pipe.

16 Claims, 10 Drawing Sheets

THERMAL CONTRACTION COMPENSATION FOR SUPERCONDUCTING AND CRYO-RESISTIVE CABLES

BACKGROUND OF THE INVENTION

The present invention relates generally to thermal contraction compensation for cables, and more particularly to an apparatus and method for compensating for thermal contraction of superconducting and cryo-resistive cables.

Short length demonstrator superconducting cable systems have been assembled and tested in a number of countries worldwide. Recent demonstrator cables have been of the high temperature superconductivity (HTSC) type with lengths typically less than 100 meters and up to a maximum of 200 meters. Earlier demonstrator cables were of the low temperature superconducting type and the cryo-resistive type. To be economically acceptable, commercial HTSC installations are required to have similar reel lengths (500 meters to 1,500 meters) to conventional cables to reduce the number of site assembled joints, which increase the risk of unreliable operation and which are expensive to assemble.

Conventional electric power cables with copper or aluminum conductors are typically installed at ambient temperature, e.g. 15° C. When carrying the rated current, they are designed not to exceed the specified operating temperature which is typically 90° C., a rise of 75° C. Although this increase is comparatively moderate, the expansion forces, if constrained, generate high thermomechanical forces. For example a stranded copper conductor having a cross sectional area of 2000 millimeters$^2$ (mm$^2$) can generate 60 kilonewtons (kN) of force. Accordingly, accessories such as joints, termination, and support structures have to be designed to withstand these forces and protect the cable system against damage. As a result, early cable systems were beset with problems of thermomechanical failure of conductor connectors in "rigidly constrained" systems and fatigue failure of a cable's metallic sheath at preferential positions in "unconstrained" systems subjected to cyclic loading.

Superconducting and cryo-resistive cables experience high thermal contraction strain when they are cooled down to their operating temperatures. The forces that are developed are sufficient to damage the cable, joints, and terminations. The conductor in a superconducting cable, particularly of the HTSC type is comprised of a large number of small and fragile elements which have low tensile strength and are difficult to connect together in a straight joint or termination in a sufficiently robust manner to withstand long term tensile forces of high magnitude. Additionally, the magnitude of current that can be carried safely in a superconducting state is limited by mechanical strain.

Insulation surrounding the conductor also contracts during cool-down and its electrical integrity is dependent upon the absence of mechanical disturbance and damage. The presence of thermal contraction strain in the cable conductor and the insulation directly impacts the feasibility and economics of HTSC cable systems in reducing the cable reel length, increasing the number of joints, reducing the current carrying capacity, and increasing the risk of electrical failure of the insulation.

Present superconducting and cryo-resistive cables operate in the temperature range of −200° C. to −270° C. The cables are installed at near room temperature, for example 15° C., and so they are required to cool-down through a large temperature drop of 215° C. to 285° C., this being some 3-4 times greater than the temperature rise experienced by conventional cables. Thus, it is apparent that the prospective thermal contraction forces experienced by the cable, joints, and terminations will be 3-4 times greater than those in conventional cable system components. Because of these forces, the amount of damage that may occur to the conductor, insulation, outer cable layers, vacuum cryostat, and coolant pressure pipes can make superconducting and cryo-resistive cables unsuitable for medium to long length commercial applications, i.e. to more than several hundred meters.

SUMMARY OF THE INVENTION

These and other shortcomings of the prior art are addressed by the present invention, which provides a method to eliminate or reduce the magnitude of thermomechanical contraction forces that are generated in a superconducting or cryo-resistive cable systems when cooled down from installation temperatures to operating temperatures.

According to one aspect of the present invention, a method of compensating for thermal contraction of superconducting and cryo-resistive cables, includes the steps of determining a compensation length for a cable such that when the cable is subjected to an operating temperature, the cable is in or near a stress-free state, and installing the cable into a pipe such that portions of the cable extend outwardly past ends of the pipe. The method further includes the steps of marking each end of the cable such that the determined compensation length is visibly shown, forcing the cable into the pipe at an ambient installation temperature such that a cable pattern is formed therein, and maintaining the cable in the pipe to prevent the cable from being pushed out of the pipe.

According to another aspect of the present invention, a cable insertion tool includes a guide tube adapted to engage a pipe and to prevent a cable positioned therein from buckling; a cross-bar adapted to move along the guide tube and engage an end of the cable positioned therein; and a cable drive apparatus operably connected to the cross-bar, the cable drive apparatus being adapted to move the cross-bar such that the cable positioned in the guide tube is forced into the pipe.

According to another aspect of the present invention, a cable includes a duct formed by a central mandrel; a tensile member positioned in the duct; at least one conductor laid upon the central mandrel; and at least one insulation layer.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
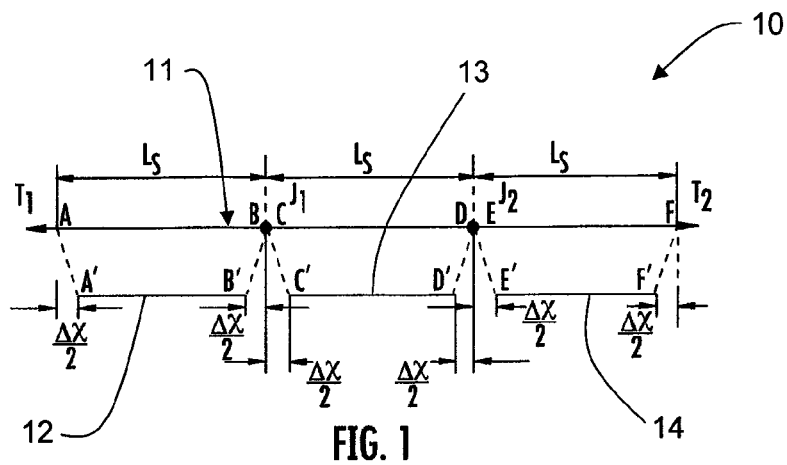
FIGS. 1 and 2 show how thermal contraction forces are formed in present uncompensated HTSC and cryogenic cable systems.
Figure 2:
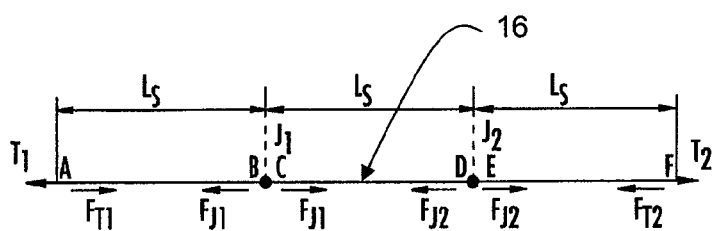

Referring to the drawings, a conventional uncompensated system is shown in FIG. 1. An HTSC or cryogenic cable system 10 with a pipe 11 extending between points A and F is illustrated. Inside the pipe 11 are three spans of cable 12-14 laid end to end, A'-B', C'-D' and E'-F', of nominal equal span lengths $L_S$, with cable terminations $T_1$ and $T_2$ and straight joints $J_1$ and $J_2$ which join the spans together. The positions of the terminations, $T_1$ and $T_2$, and cable joints, $J_1$ and $J_2$, are fixed in relation to the ground. The cables 12-14 are pulled into each pipe span A-B, C-D, and E-F, and are jointed to form a single cable 16, as shown in FIG. 2. The pipe 11 is then closed and sealed over the joints $J_1$ and $J_2$. Coolant is introduced either into the pipe 11 or into a second pipe (not shown) that surrounds pipe 11. The cable 16 is then cooled down to its operating temperature.

As shown, if the cable lengths had not been jointed together they would be free to contract a total length $\Delta x$, Equation 1, this being equivalent to a retraction of $\Delta x/2$ at the end of each cable span. In a practical cable system the cables are jointed together and are not free to contract, so at operating temperature the contraction strain $\Delta x/L_S$ is locked into the cable and joints throughout the circuit length and generates high thermomechanical tensile forces. The total length $\Delta x$ is calculated as follows:

$$\Delta x = L_S \cdot \alpha \cdot \Delta \theta \quad \text{Equation 1}$$

Where $\Delta x$ is the total prospective thermal retraction length in meters (m) of the cable in one pipe span; $L_S$ is the initial length in meters (m) of cable at the installation ambient temperature; $\alpha$ is the effective coefficient of thermal expansion of the cable ($K^{-1}$); and $\Delta \theta$ is the temperature change from installation to operating temperature in Kelvin (K).

As shown in FIG. 2, the thermomechanical tensile forces $F_T$ and $F_J$ act axially at the terminations $T_1$ and $T_2$ and the joints $J_1$ and $J_2$. If the span lengths are equal and the route geometry is uniform, a magnitude of the axial tensile force F may be calculated using Equation 2. The axial force is primarily generated in the main cable tensile members, these being the conductor(s), and the metallic sheath as these have a high modulus of elasticity. The axial tensile force F acts throughout the length of the cable system and generates radial sidewall forces $F_{sw}$ at the bends. Unless controlled by design measures, the axial and sidewall forces are capable of damaging the conductor connections and the insulation. The axial tensile force F and radial sidewall forces $F_{sw}$ are calculated using the following equations:

$$F = K \cdot \alpha \cdot \Delta \theta \quad \text{Equation 2}$$

$$F_{sw} = F/R_B \quad \text{Equation 3}$$

Where F is the thermomechanical axial force acting in a cable or cable element expressed in newtons (N); $F_{sw}$ is the thermomechanical sidewall force acting in a cable or cable element expressed in newton-meters ($Nm^{-1}$); K is the effective axial stiffness of a cable or cable component expressed in newtons (N); and $R_B$ is the radius of a bend in a cable expressed in meters (m).

Figure 3:
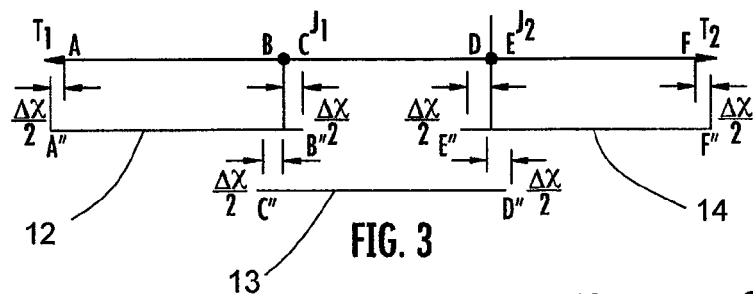
FIGS. 3 and 4 show a cable compensation length to eliminate or reduce thermal contraction forces according to an embodiment of the invention.

Referring to FIG. 3, according to an embodiment of the invention, a compensation length $\Delta x/2$ is calculated and is marked on each end of cable that protrudes from a pipe end to increase the cable total length from A'-B' to A"-B". A sufficient compensation length is provided such that the cable 16 will be in a mechanically stress-free state at its operating temperature.

Figure 4:
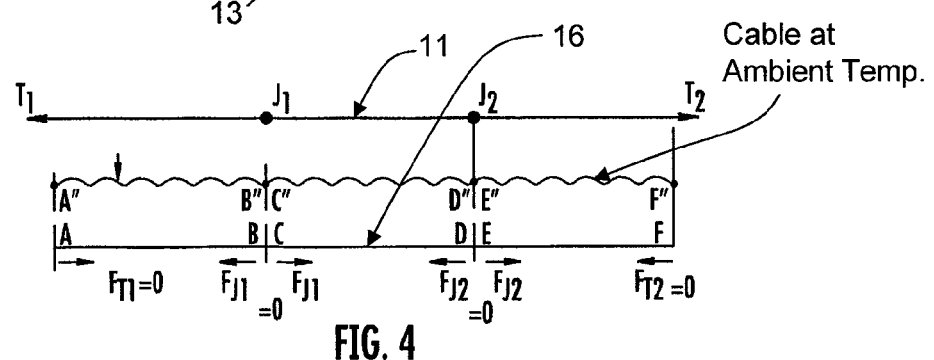

As illustrated in FIG. 4 with the cable 16 jointed and installed in the pipe 11 at ambient installation temperature, the increase in cable length has been absorbed by the formation of "cable patterns" within the pipe 11. As the cable 16 cools down, the cable 16 thermally contracts by the same amount as the stored compensation length. Accordingly, the cable 16 is subjected to minimal tensile forces acting on the cable conductor and joint conductor connectors, minimal sidewall forces acting on the insulation at bends in the route, and minimal tensile stress in the cable sheath to withstand high coolant pressures, e.g. 14 bar. Thus, the cable is now straight and the thermomechanical axial forces, $F_T$ and $F_J$ are of zero or near zero magnitude.

In some cable applications, a compromise with other aspects of cable design may prohibit the attainment of a completely stress-free cable system. In such applications the compensation length is used to reduce the tensile and sidewall forces to a magnitude that can be safely withstood by the cable and accessories during the required service life.

Figure 5:
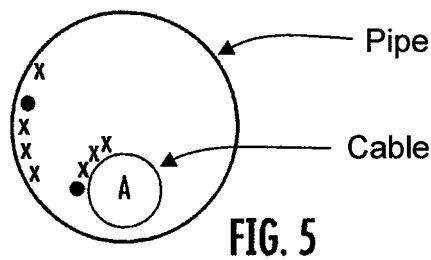
FIGS. 5 to 8 show cross-sections of cable configurations inside pipes.
Figure 6:
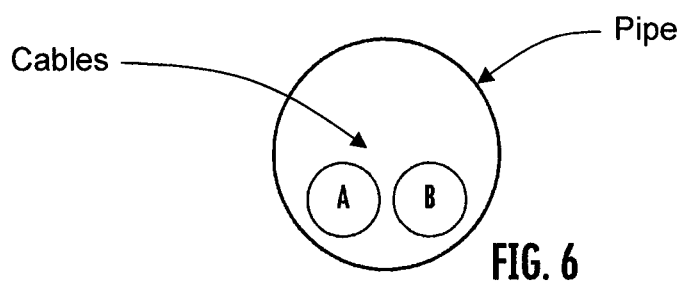
Figure 7:
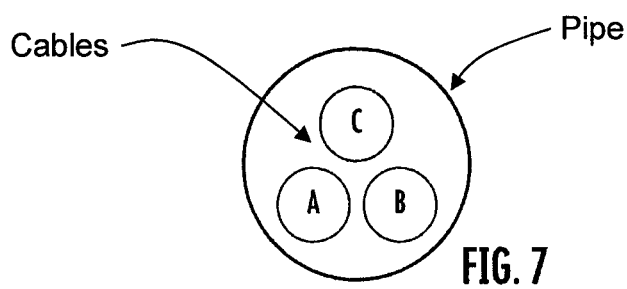
Figure 8:
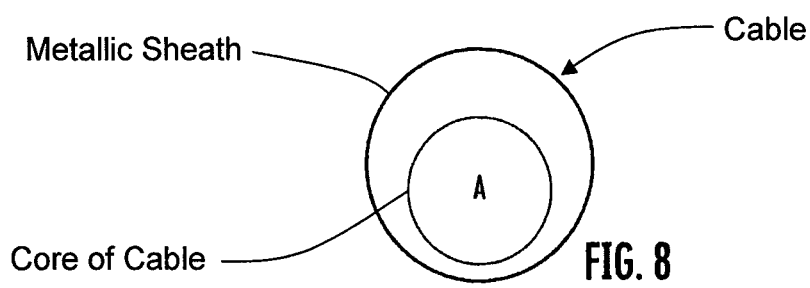

The method described above may be used to achieve a calculated compensation length in multiple applications. For example, the method may be used with a single cable installed into a pipe or duct system, FIG. 5, several cables installed together into a duct or pipe system, FIGS. 6 and 7, or in applications where a cable is fitted inside a metallic sheath in the factory before it is delivered to a site, FIG. 8.

Figure 9:
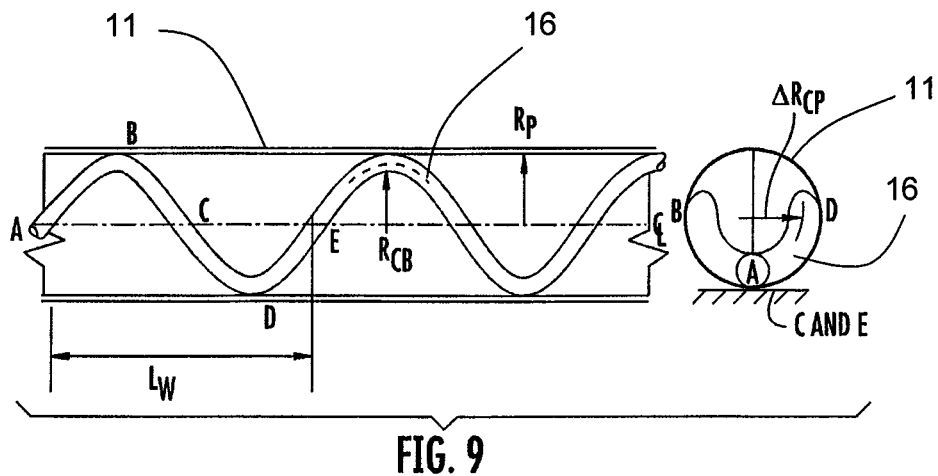
FIG. 9 shows a cable formed into a helical sinusoid within a pipe to store compensation length.
Figure 10:
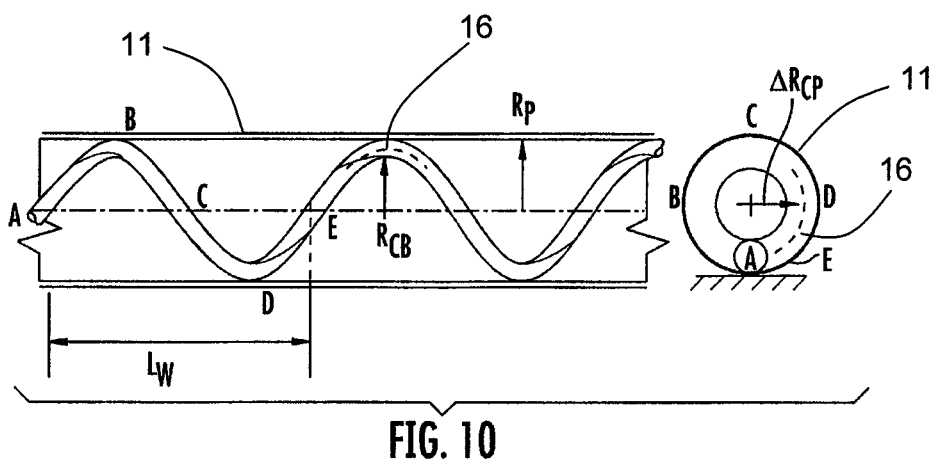
FIG. 10 shows a cable formed into a helix within a pipe to store compensation length.

To install the cable 16 into the pipe 11, the cable is forcefully pushed into the duct, pipe, or sheath (hereinafter collectively referred to as pipe) by the pre-calculated compensation distance, $\Delta x$, and formed into a pre-designed cable pattern. The cable 16 may be pushed into the pipe 11 by $\Delta x$ from one joint position or preferably by $\Delta x/2$ at the two joint positions on each end of the pipe span to induce the cable 16 to store the compensation distance into a loose pipe. The compensation being stored in the form of pre-calculated lateral deflections of the cable 16 in relation to the axis of the pipe 11. For example, the cable 16 may be stored in a helical sinusoid pattern, FIG. 9, or a true helical pattern, FIG. 10, formed around the internal circumference of the pipe 11. In the simplest form, the pattern would be a lateral planar deflection, FIG. 11, of the cable 16 outwards at natural bends in the route geometry and in additional pre-formed bends provided for this purpose.

Figure 11:
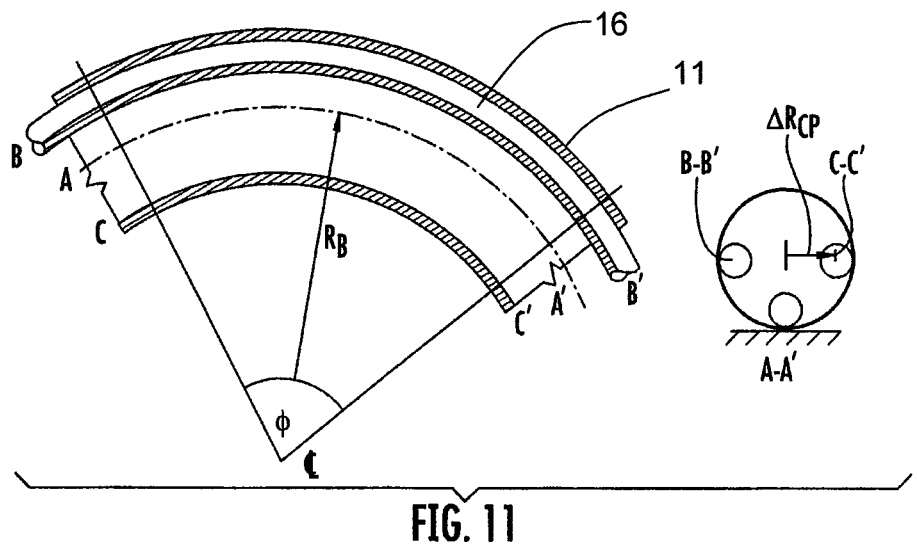
FIG. 11 shows a cable formed into a lateral deflection in a pipe bend to store compensation length.
Figure 18:
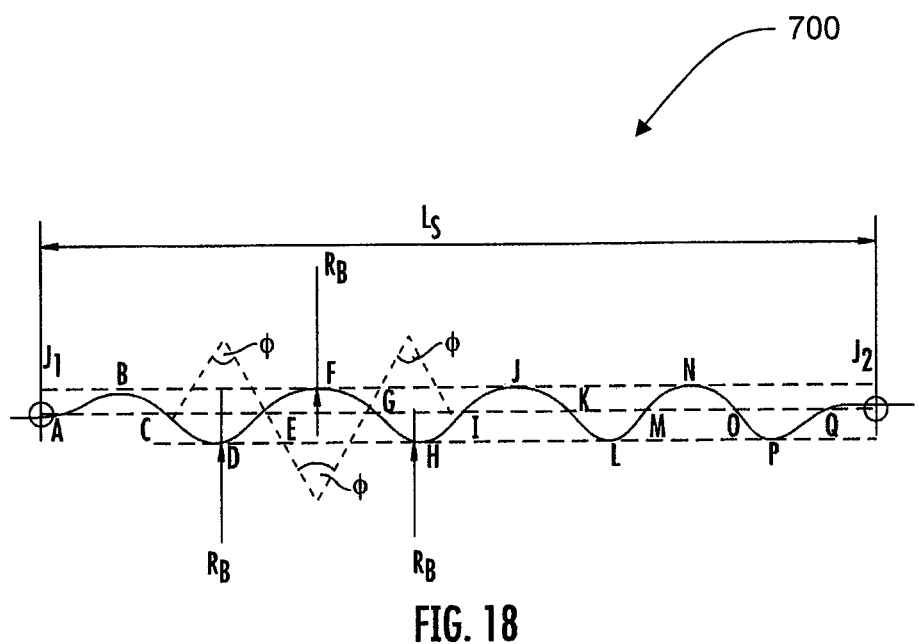
FIG. 18 shows a pipe formed into bend patterns to provide cable compensation length.

The cable absorption length that can be stored is controlled by the pipe radial clearance $\Delta R_{cp}$ and the wavelength $L_W$. The helical pattern requires the highest insertion force, but is capable of absorbing a long cable compensation length. The helical sinusoid requires a lower insertion force, with a medium capability to store cable compensation length. The lateral deflection of the cable in a pipe bend requires the lowest insertion force and is capable of absorbing a high cable compensation length. The length that can be stored in pre-formed pipe bends, FIG. 11 and FIG. 18, is proportional to the product of the number of bends, the radial clearance $\Delta R_{cp}$ and the bend angle $\theta$. The compensation storage patterns are preferably pre-designed using an FEA dynamic computation technique which will model the behavior of the cable in the particular route geometry comprising natural bends and inclines. In cases of simple routes which have neither bends nor inclines the design may be achieved using mathematical algorithms. A key part of the formation of the patterns is the achievement of elastic buckling at low axial force during installation. Elastic buckling is a reversible geometric deformation that permits the cable to re-straighten when it is cooled and which permits the pattern to reform when the cable re-heats to ambient temperature. For example, during a planned maintenance procedure, or an unplanned cable system fault.

To reduce the amount of force needed to push the cable into a pipe, the outer surface of the cable and the inner surface of the pipe may be coated with a combination of materials to minimize longitudinal friction, and achieve a unified distribution of stored compensation strain in the cable along the pipe span length. The inner surface of the pipe may be coated with a low friction material containing poly-tetra-flouro-ethylene (PTFE). Alternatively, or in combination, the cable may be provided with a polymeric extruded jacketing material of high shore hardness, such as a medium to high density grade of polyethylene (PE), a polypropylene jacket, a nylon jacket or a nylon co-extruded jacket on a base of PE. The surfaces may also be lubricated at the time of installation with, for example, a synthetic or natural wax based solution or a graphite based dry powder.

To aid in inserting a cable into a pipe, as described above, cable insertion tools, FIGS. 12-16, may be used to achieve a calculated cable compensation distance. In each of the tools described below, a temporary guide tube may be connected to the end of the pipe span. The guide tube provides a close fit to the cable to prevent it from locally buckling when pushed into the pipe and may be terminated with "bell mouths" to protect the cable from excessive bending. The insertion tools of FIGS. 12-15 apply an axial force via an end cap and are suitable for use with all superconducting or cryo-resistive cable constructions.

Figure 12:
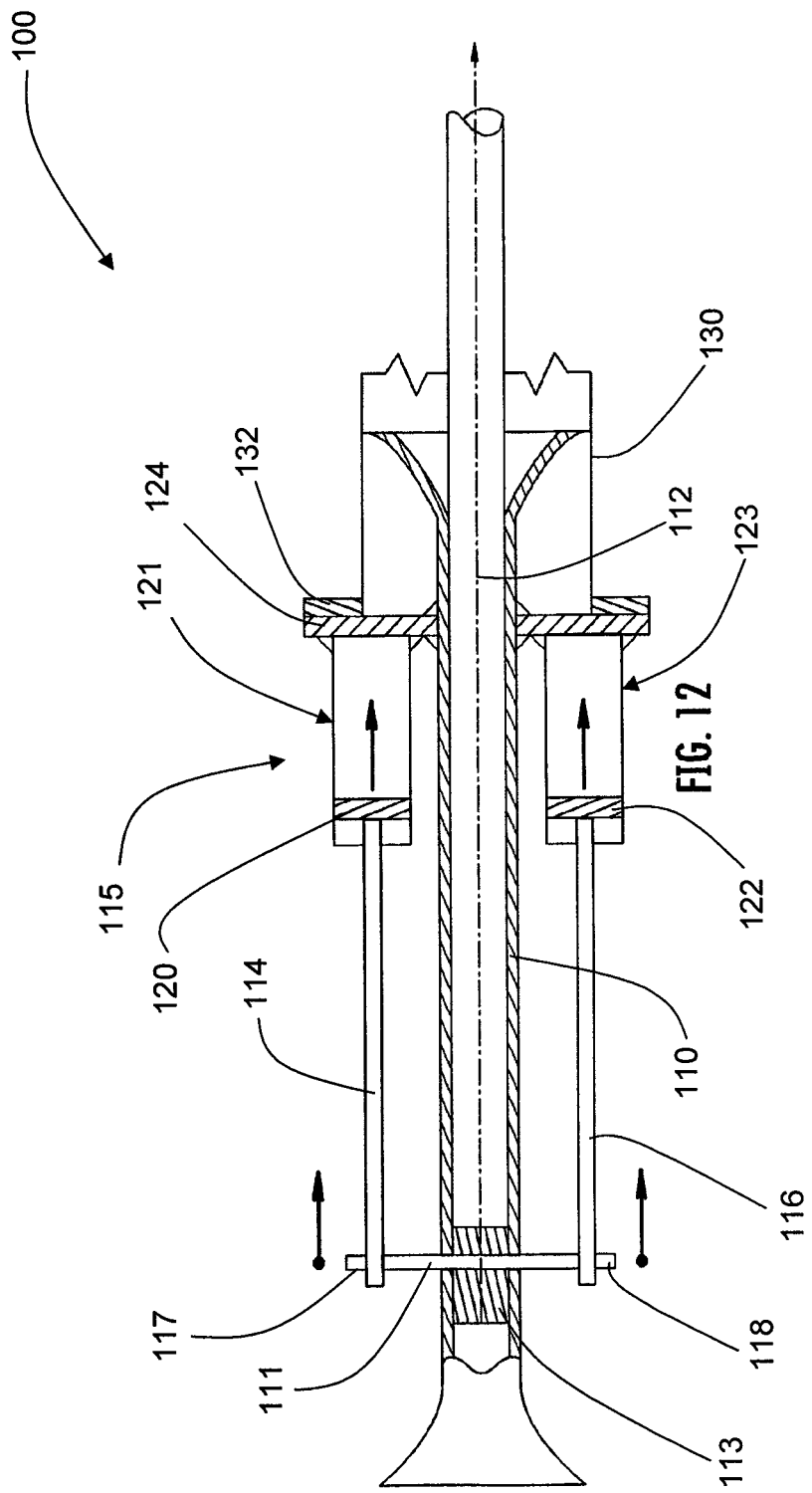
FIG. 12 shows a hydraulic/pneumatic ram insertion tool for inserting a compensation length of cable into a pipe.

Referring to FIG. 12, a hydraulically or pneumatically powered insertion tool is shown at reference numeral 100. The insertion tool 100 includes a guide tube 110 having opposing longitudinal slots (not shown) to allow a cross-bar 111 to slide axially along the guide tube 110 and to engage a cable 112 and an end cap 113. A cable drive apparatus 115 forces the cable 112 into the pipe 130 and includes connecting rods 114, 116 and rams 121, 123. Connecting rods 114 and 116 are connected to opposing ends of the cross-bar 111. Connecting rod 114 connects a first end 117 of the cross-bar 111 to a first piston 120 of ram 121, and connecting rod 116 connects a second end 118 of the cross-bar 111 to a second piston 122 of ram 123. The rams 121 and 123 are integral with an end plate 124 of the insertion tool 110 and may be hydraulically or pneumatically powered.

Figure 17:
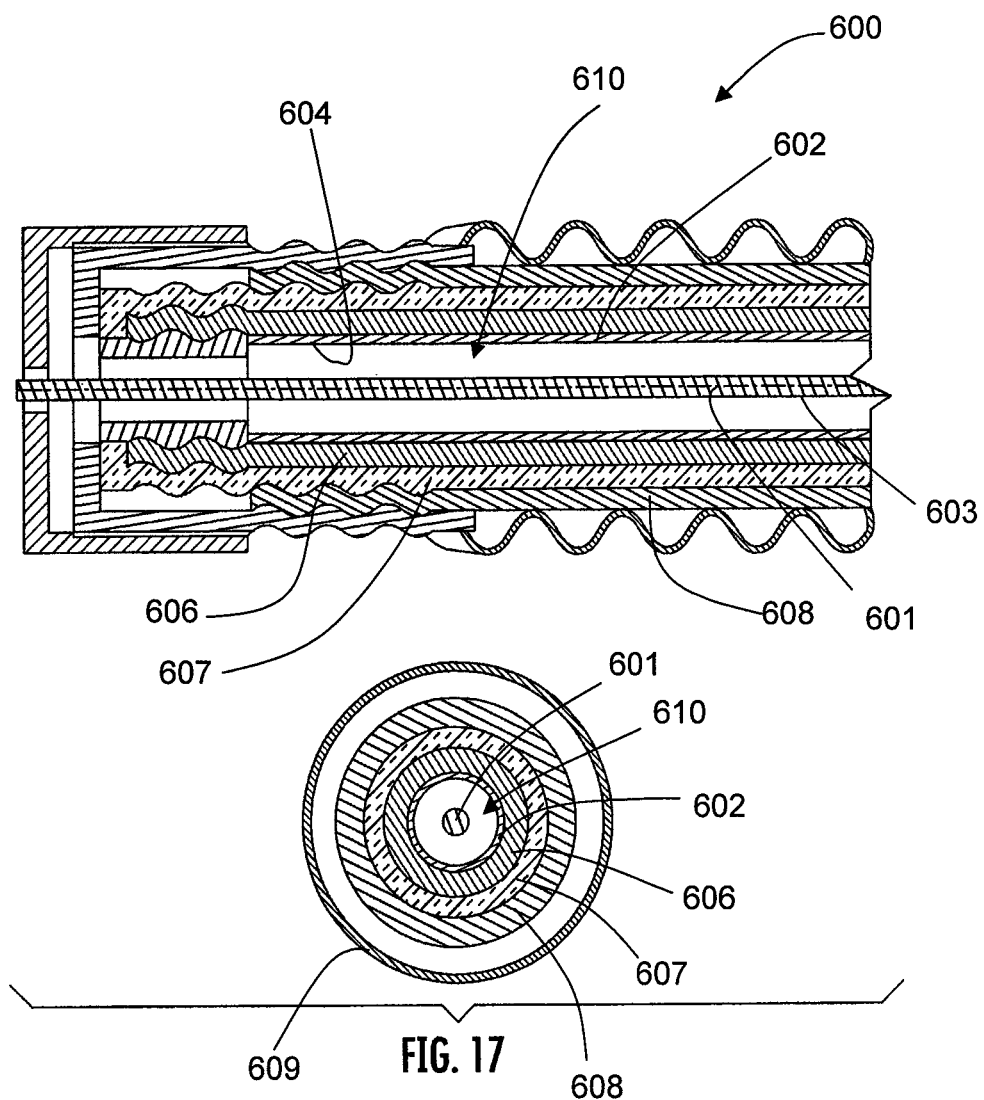
FIG. 17 shows a cable construction according to an embodiment of the invention.

In use, after installation into a pipe 130, the cable 112 is cut and terminated with the end cap 113, similar to that shown in FIG. 17. By using the end cap 113, each layer of the cable 112 is mechanically gripped to uniformly distribute compressive and tensile force. Sufficient cable length is provided to accommodate the compensation length and the joint length. The operator marks positions on the guide tube of the initial cable end position, the specified compensation distance, and the final cable end position. Liquid or gas pressure is applied to the rams 121, 123 and the cable 112 is pushed into the pipe 130 by the specified distance.

The above process is preferably performed simultaneously at both ends of the pipe 130. If the process is only performed at one end of the pipe 130, then the cable 112 is clamped at the opposite end of the pipe 130 to prevent outwards movement. After cable insertion is completed, the ends of the cable 112 are clamped to the pipe 130 to prevent compressive forces in the cable 112 from pushing the cable 112 back out of the pipe 130. A clamp 131 is located between the pipe 130 closure flange 132 and the insertion tool end plate 124, such that after tightening the clamp 131 to grip the cable 112, the guide tube 110 may be removed. The joint between the adjacent cable lengths is then assembled. The clamps 131 may then either be removed or left permanently in position to protect the joint from movement due to any differential cable forces that may occur in service operation.

Figure 13:
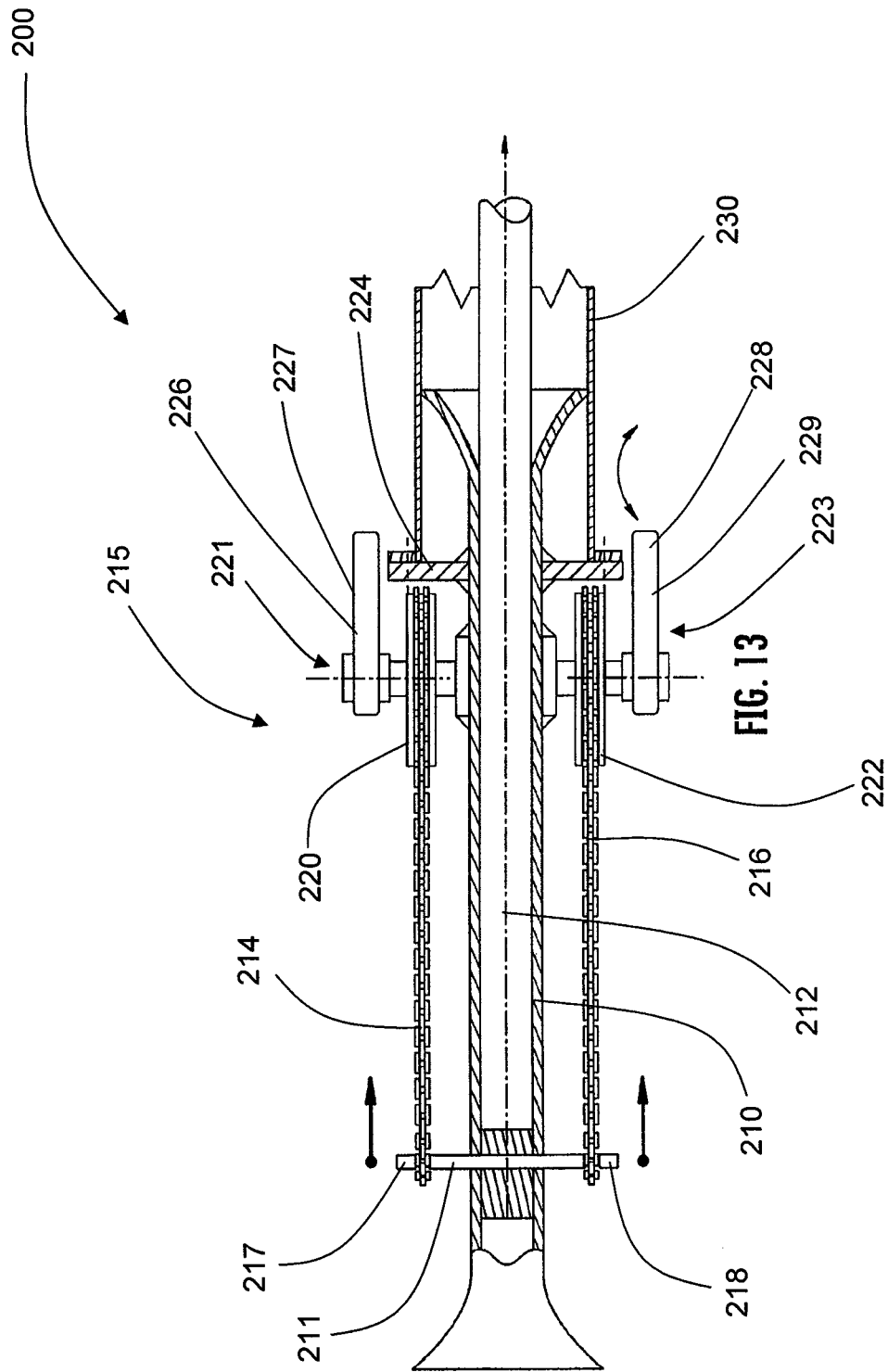
FIG. 13 shows a chain and ratchet insertion tool for inserting a compensation length of cable into a pipe.

As shown in FIG. 13, a chain and ratchet powered insertion tool is illustrated at reference numeral 200. The insertion tool 200 is similar to insertion tool 100 except insertion tool 200 uses a chain and ratchet cable drive apparatus 215 to force a cable 212 into a pipe 230. Like insertion tool 100, insertion tool 200 includes a guide tube 210, a cross-bar 211, and an end plate 224. Unlike insertion tool 100, insertion tool 200 uses twin flexible drive chains 214 and 216 connected at opposing ends of cross-bar 211. Drive chain 214 connects a first end 217 of the cross-bar 211 to a first ratchet 221 having a sprocket 220, a handle 226 and a pawl 227. Drive chain 216 connects a second end 218 of the cross-bar 211 to a second ratchet 223 having a sprocket 222, a handle 228 and a pawl 229. It should be appreciated that the handles 226, 228 may be replaced with motors or other means for rotating the sprockets 220 and 222. Upon rotation of the sprockets 220 and 222, the chains 214 and 216 are drawn around the sprockets 220 and 222 and the cable end is pushed into the pipe 230.

Figure 14:
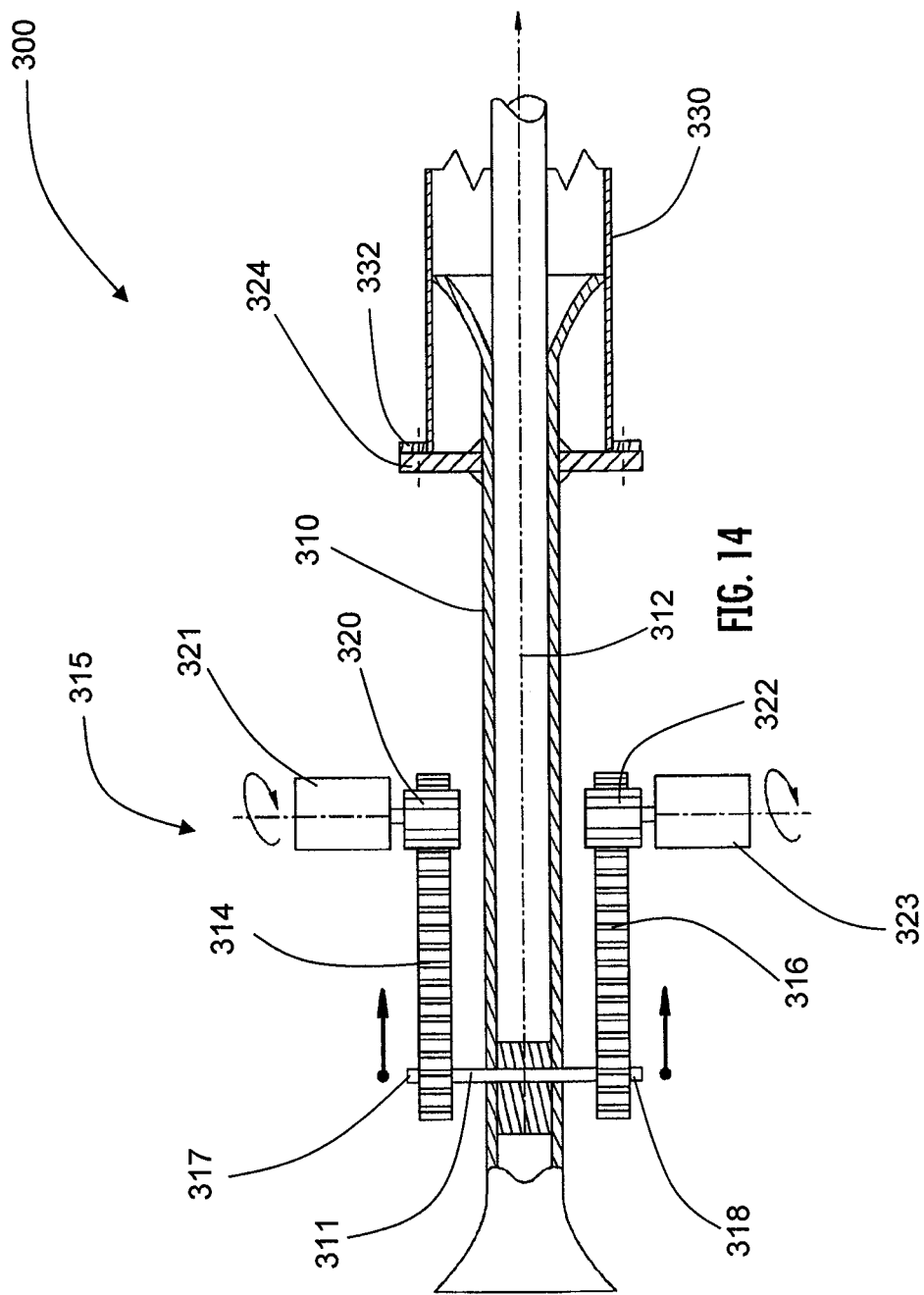
FIG. 14 shows a rack and pinion insertion tool for inserting a compensation length of cable into a pipe.

Referring to FIG. 14, a rack and pinion gear insertion tool is shown at reference numeral 300. The insertion tool 300 is similar to insertion tool 100 except insertion tool 300 uses a rack and pinion cable drive apparatus 315 to force a cable 312 into a pipe 330. Like insertion tool 100, insertion tool 300 includes a guide tube 310, a cross-bar 311, and an end plate 324. The insertion tool further includes twin toothed racks 314 and 316 connected to opposing ends of cross-bar 311. Rack 314 connects a first end 317 of the cross-bar 311 to pinion gear 320, and rack 316 connects a second end 318 of the cross-bar 311 to pinion gear 322. The pinion gears 320 and 322 are rotated by motors 321 and 323, respectively, such that the racks 314 and 316 are drawn towards the pipe's 130 closure flange 332, thereby pushing the cable into the pipe 330. It should be appreciated that the pinion gears 320 and 322 may be located on the cross-bar 311 and the racks 314 and 316 fixed to the insertion tool end plate 324.

Figure 15:
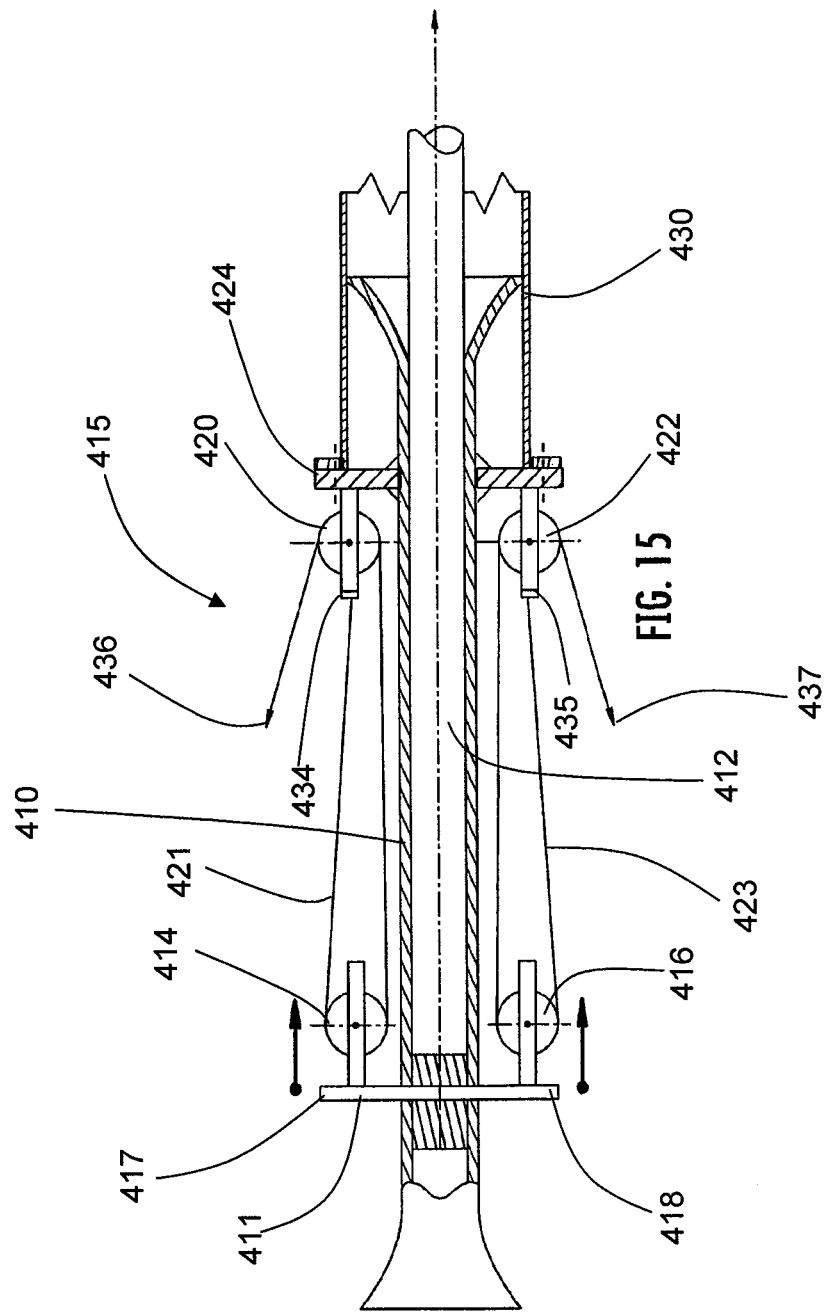
FIG. 15 shows a block and tackle insertion tool for inserting a compensation length of cable into a pipe.

A block and tackle pulley insertion tool is shown in FIG. 15 at reference numeral 400. The insertion tool 400 is similar to insertion tool 100 except insertion tool 400 uses a twin block and tackle cable drive apparatus 415 to force a cable 412 into a pipe 430. Like insertion tool 100, insertion tool 400 includes a guide tube 410, a cross-bar 411, and an end plate 424. Unlike insertion tool 100, insertion tool 400 uses pulleys 414 and 416 connected at opposing ends of cross-bar 411 and pulleys 420 and 422 connected to opposing ends of the end plate 424. Pulley 414 is connected to a first end 417 of the cross-bar 411 and is connected to pulley 420 by a rope 421. Pulley 416 is connected to a second end 418 of the cross-bar 411 and is connected to pulley 422 by a rope 423. Ropes 421 and 423 each include a terminated end 434, 435 and a free end 436, 437, respectively. It should be appreciated that the ropes 421 and 423 may be of a high strength, low stretch material such as stranded steel, Kevlar or any other suitable material. Further, it should be appreciated that the term rope is being used generally and may include cables, bands, or other suitable devices for interacting with and between pulleys. Free ends 436 and 437 of ropes 421 and 423, respectively, may be pulled by using any suitable means, such as by a motor powered capstan, to draw the ropes 421 and 423 through the pulley system, thereby pushing the cable 412 into the pipe 430.

Figure 16:
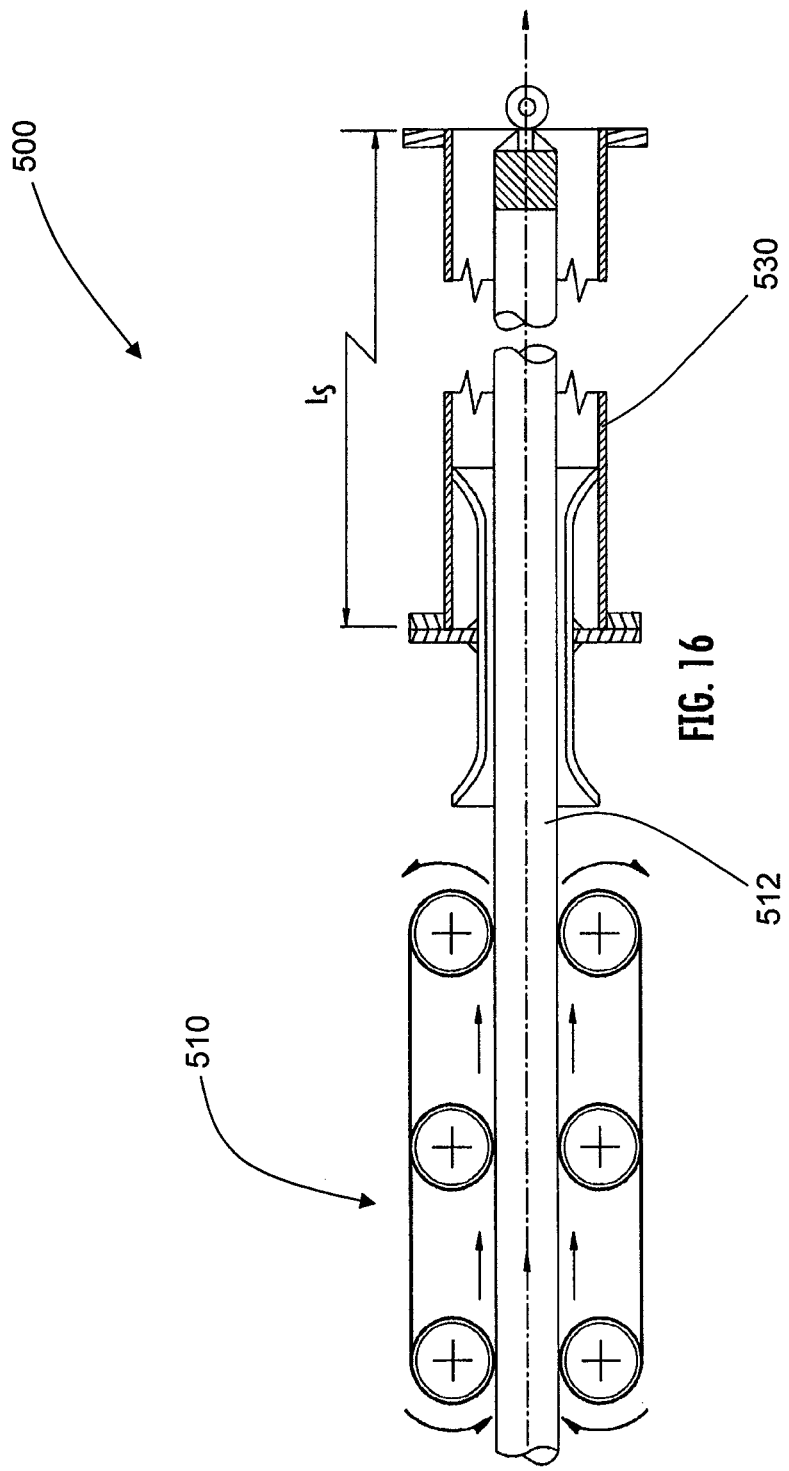
FIG. 16 shows a cable engine insertion tool for inserting a compensation length of cable into a pipe.

Referring to FIG. 16, a cable engine insertion tool is shown at reference number 500. In addition to the insertion tools described above, the cable compensation length of cable 512 may be pushed into the pipe 530 by either one or a series of conventional designs of cable engine, such as the caterpillar cable engine shown. In this scenario, a cable engine 510 is located at both the input and output end of the pipe span such that both engines 510 simultaneously push the cable 512 inwards. To overcome the effect of friction in long pipe spans, the pipe 530 may be temporarily subdivided into shorter sections to provide the distance necessary to locate additional cable engines, without the need to cut and subsequently joint the cable. After the required cable compensation length has been pushed into the pipe 530, the pipe 530 is closed and sealed at the intermediate positions.

In addition to using insertion tools, like those disclosed above, other means may be used to aid the process of inserting a cable into a pipe. For example, vibration may be applied to the pipe during or after the cable insertion operation. The use of vibrations help reduce the insertion force needed and help uniformly distribute the compensation length. Based on finite element analysis, it has been shown, for example, that a vibration of frequency 13 Hz and magnitude 0.032 mm is sufficient to momentarily lift a cable from the constraint of gravity and friction and permit stored compressive strain to move the cable along the pipe. The vibration may be applied by a powered vibration tool applied to the pipe at a number of positions according to the span length. The vibration tool may be, for example, an electronically powered transducer or a motor driven eccentrically loaded rotor disc.

In another example, an impulsive shock may be applied to the cable during or after the cable insertion process to reduce the insertion force and uniformly distribute the compensation length. A pulse of electric current applied along a conductor in the cable produces a momentary electro-mechanical impulsive force of sufficient magnitude to momentarily lift the cable from the constraint of gravity and friction and permit stored compressive energy to move the cable along the pipe. A parallel return conducting path is required to return the pulse of current, such as along two or more cables in one pipe, or in the case of one cable in the pipe, a second temporary cable laid either inside or outside the pipe.

The impulsive force results from the interaction of the magnetic field from one conductor with the current in the second conductor. The advantages of this are that the cable is lifted throughout the length of the pipe and it is unnecessary to provide external access to the pipe or to distribute mechanical vibrating machines along the pipe. The magnitude of the current may be calculated to suit the particular cable unit weight. For example, a simultaneous current pulse of peak magnitude 28 kA and $5 \times 10^{-3}$ seconds duration applied to three heavy 230 kV, 2500 kcmil transmission class cables is sufficient to momentarily lift them and permit longitudinal movement. The current pulse may be applied by either discharging a charged capacitor, discharging the cable insulation, or short circuiting the output of a spinning generator along the cable through a suitable series impedance.

Referring to FIG. 17, in another embodiment of the invention, a cable is shown at reference numeral 600. The cable 600 includes a central mandrel 602 forming a duct 610. A tensile member 601 in the form of a rope selected to have the properties of low extension under load (high elastic modulus) and high tensile strength, such as a steel rope, an aluminum alloy rope or a Kevlar rope is inserted into the duct 610 of the central mandrel 602. An outer surface 603 of the rope 601 may be jacketed and an inner surface 604 of the duct 610 may be formed of, or lined with, materials selected to reduce longitudinal friction.

The flexible tensile member 601 is tightened after installation and before jointing to provide the cable compensation length by longitudinally compressing the cable 600 construction and forcing the cable 600 to initiate the formation of lateral patterns, thereby relieving the cable 600 and its joints and terminations from experiencing an unacceptable magnitude of tensile load at cable operating temperature. The tightening of the tensile member 601 may be performed in combination with the cable insertion process described above to reduce the insertion force and achieve a uniform distribution of patterns. Clamps are applied to the cable 600 at each end of the pipe 630 to prevent the compressed cable 600 from moving. The tensile member 601 is then released at one or both cable ends and the cables are jointed together. During cool-down the stored cable compensation length is released to cancel the thermal contraction strain and to eliminate tensile thermomechanical forces.

The cable 600 construction is designed such that it may be axially compressed during the cable insertion process and extended during the cable cool-down. The cable's 600 low axial modulus is achieved by using a flexible central mandrel upon which inner and outer conductors 606, 608 are laid, both longitudinally radially. The conductors 606 and 608 are applied at short lay angles with low compaction and with discrete interstitial gaps between the wires and tapes. The inner and outer conductors 606, 608 and their internal successive layers of wires or tapes are applied in a uni-lay direction, and insulation 607 is formed of a longitudinally deformable material, for example, an extruded elastomeric insulation with a low temperature, low modulus of elasticity such as a silicone elastomer or an EPR elastomer, or a taped construction of laminate or Kraft paper insulation separated by suitably sized butt gaps. A metallic sheath 609 with a thin corrugated wall and a short pitch, for example, 1 mm thick sheet stainless steel is also used.

In addition to achieving an axially compressible construction, the uni-lay conductor 600 produces a non-torque balanced cable that will readily form spiral helices under the action of low compressive force. During installation into the pipe the cable is protected from being extended by restricting the pulling tension to a minimal value suitable for cable guidance only and by the use of a cable engine or distributed engines as described above. The use of the cable construction with a tensile member 601 inside a duct 610 of the mandrel 602 permits the cable 600 to be pulled into the pipe from its leading end without risk of extension. During the pull the tensile member 601 is connected to the cable 'pulling bolts' (pulling eyes) connected to each end of the cable, such that the member 601 withstands the tension and protects the cable 600 from extension. The cable 600 is then clamped, the internal member is released, and the cables are jointed together.

Referring to FIG. 18, a method of pre-forming a pipe into a series of permanent bends is shown at reference numeral 700. By pre-forming a pipe with a series of bends, the pipe is able to accommodate the cable compensation length by the cumulative outward deflection of the cable in each bend, as illustrated in FIG. 11. The compensation length is directly proportional to the product of the number of bends, the bend angle θ, and the diametral clearance between the cable and the pipe $\Delta R_{cp}$. After installation of the cable into the pipe the cable compensation length is pushed into the pipe using one of the cable insertion methods described above. The cable is moved outwards and upwards to the outer wall of the bends as shown in FIG. 11, thereby accommodating the increased length B-B'. During cool-down the cable length contracts to length C-C' such that it moves to contact the inner side of the pipe bend thereby releasing the maximum compensation length, this being the difference between B-B' and C-C'. The radius $R_B$ of the pipe bend is selected to be greater than the minimum permitted bending radius of the cable.

The cable may alternatively be installed without being forcefully inserted outwards into the pre-formed bends. In this instance, the cable is inserted a sufficient distance to lie on the neutral axis of the pipe A-A' such that 50% of the prospective distance is released when the cable moves to the inner wall of the bend, C-C' during cooldown. The advantages of this method are that the pipe bends control the uniform distribution of bending along the cable length, a comparatively small pipe diameter may be selected, and longitudinal cool-down stresses in the pipe are reduced.

It should also be appreciated that the pipe may be elastically deformed during installation into temporary bends. The initial increase in cable length compared to the straight span length provides the compensation length. During cool-down the elastic pipe deformation is progressively released such that the pipe and cable become straight. This allows the pipe to temporarily accommodate the compensation distance by increasing the pipe length, such that the distance A, B, C, D . . . Q is greater than the straight span length $L_S$. This can be advantageous when the cable is required to be a tight fit in the pipe or metallic cable sheath. This is particularly suited for cable applications that provide accessibility to the pipe, for example, those above ground or in a tunnel. The maximum amplitude of the patterns is dictated by the safe bending strain for the pipe. The amplitude may be increased by use of a corrugated pipe or metallic cable sheath exhibiting low bending stiffness or the insertion into the pipe at regular intervals of longitudinal flexible bellows. The pipe amplitude may be achieved by the use of a conventional pipe bending tool in which the pipe is anchored at two closely spaced half wavelength points. The pipe is then deflected outwards by a hydraulic ram pressing on a curved shoe. The pipe system is held in the deformed shape by temporary distributed clamps.

The cable is next installed into the deformed pipe. The difference between the length A . . . Q and $L_S$ provides the compensation length. The joints are then made to connect the ends of the cables together and the pipe is closed. During cool-down the positions of the temporary pipe clamps are progressively relaxed to permit the pipe patterns to move elastically inwards back to the original straight length. When the cable is required to be re-heated to ambient temperature, the temporary cleats are re-applied and pulled back to their original positions as the temperature rises. Alternatively the cleats may be left permanently in position and be restrained by steel springs, such that the positions of the temporary pipe clamps are progressively relaxed to permit the pipe patterns to move elastically inwards back to the original straight length. When the cable is required to be re-heated to ambient temperature, the temporary cleats are re-applied and pulled back to their original positions as the temperature rises. Alternatively, the cleats may be left permanently in position and be restrained by steel springs, such that upon cooling the pipe straightens and extends the springs and upon re-heating, the pipe expands and is pulled back into the original pattern.

The foregoing has described an apparatus and method for compensating for thermal contraction of superconducting and cryo-resistive cables. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. A method of compensating for thermal contraction of superconducting and cryo-resistive cables, comprising the steps of:
    (a) determining a compensation length for a cable such that when the cable is subjected to an operating temperature, the cable is in or near a stress-free state;
    (b) installing the cable into a pipe such that portions of the cable extend outwardly past ends of the pipe;
    (c) marking each end of the cable such that the determined compensation length is visibly shown, cutting each end of the cable at the predetermined compensation length, and terminating each end of the cable with an end cap;
    (d) forcing the cable into the pipe at an ambient installation temperature such that a cable pattern is formed therein; and
    (d) securing the cable in the pipe to prevent the cable from being pushed out of the pipe.

2. The method according to claim 1, wherein the cable pattern is a helical sinusoid pattern.

3. The method according to claim 1, wherein the cable pattern is a true helical pattern.

4. The method according to claim 1, wherein the cable pattern is a lateral planar deflection.

5. The method according to claim 1, wherein the compensation length is stored in the cable pattern.

6. The method according to claim 1, further including the step of cooling the cable from the ambient installation temperature to the operating temperature such that upon cooling, the cable contracts causing the cable pattern to straighten.

7. The method according to claim 1, further including the step of coating the outside of the cable with a material suitable for minimizing friction between the pipe and the cable.

8. The method according to claim 1, further including the step of coating the inside of the pipe with a material suitable for minimizing friction between the pipe and the cable.

9. The method according to claim 1, further including the step of providing a cable with a polymeric jacket to minimize friction between the pipe and the cable.

10. The method according to claim 1, further including the step of using an insertion tool to force the cable into the pipe, the insertion tool having a guide tube to prevent the cable from buckling during installation.

11. The method according to claim 10, further including the step of marking the guide tube with an initial cable end position, a specified compensation distance, and a final cable end position.

12. The method according to claim 1, further including the step of forcing the cable into the pipe at both ends of the cable simultaneously.

13. The method according to claim 1, further including the step of applying vibrations to the pipe to reduce an amount of insertion force needed to install the cable and to uniformly distribute the compensation length along the pipe.

14. The method according to claim 1, further including the step of applying an impulsive shock to the cable to reduce an amount of insertion force needed to install the cable and to uniformly distribute the compensation length along the pipe.

15. The method according to claim 1, further including the step of pre-forming the pipe into a series of bends.

16. The method according to claim 15, wherein the bends permit the pipe to accommodate the cable compensation length by causing an outward deflection of the cable in each of the bends.

\* \* \* \* \*